US012576371B2

(12) United States Patent
Zieger et al.

(10) Patent No.: US 12,576,371 B2

(45) Date of Patent: Mar. 17, 2026

(54) SOLUTION APPLICATOR ASSEMBLY WITH REMOVABLE FLOW CONTROL INSERT

(71) Applicant: Clean Logix, LLC, Grand Rapids, MI (US)

(72) Inventors: Andrew J. Zieger, Grand Rapids, MI (US); Adam D. Jacques, Caledonia, MI (US)

(73) Assignee: CLEAN LOGIX, LLC, Grand Rapids, MI (US)

( * ) Notice: Subject to any disclaimer, the term of this patent is extended or adjusted under 35 U.S.C. 154(b) by 968 days.

(21) Appl. No.: 17/751,905

(22) Filed: May 24, 2022

(65) Prior Publication Data

US 2023/0066306 A1 Mar. 2, 2023

Related U.S. Application Data

(60) Provisional application No. 63/237,980, filed on Aug. 27, 2021.

(51) Int. Cl.

| | |
|---|---|
| ***B01F 25/312*** | (2022.01) |
| ***B01F 23/232*** | (2022.01) |
| ***B05B 7/00*** | (2006.01) |

(52) U.S. Cl.

CPC ...... *B01F 25/31242* (2022.01); *B01F 23/232* (2022.01); *B05B 7/0025* (2013.01)

(58) Field of Classification Search

CPC ......................... B01F 25/31242; B01F 23/232

See application file for complete search history.

(56) References Cited

U.S. PATENT DOCUMENTS

| | | | |
|---|---|---|---|
| 6,607,174 | B2 | 8/2003 | Weber et al. |
| 6,619,318 | B2 | 9/2003 | Dalhart et al. |
| 7,040,551 | B2 | 5/2006 | Rummel |
| 7,168,593 | B2 | 1/2007 | Schroeder et al. |
| 7,438,537 | B2 | 10/2008 | Walton |
| 7,524,466 | B2 | 4/2009 | Long |
| 7,641,132 | B2 | 1/2010 | Richards |
| 9,174,178 | B2 | 11/2015 | Berger et al. |
| 9,249,913 | B2 | 2/2016 | Petrangeli et al. |
| 9,339,773 | B2 | 5/2016 | Harris et al. |
| 9,375,688 | B2 | 6/2016 | Petrangeli et al. |
| 9,376,308 | B2 | 6/2016 | Petrangeli et al. |

(Continued)

FOREIGN PATENT DOCUMENTS

| | | |
|---|---|---|
| CN | 105457515 B | 8/2017 |
| CN | 107511087 A | 12/2017 |

(Continued)

*Primary Examiner* — Elizabeth Insler

(74) *Attorney, Agent, or Firm* — Dickinson Wright PLLC

(57) ABSTRACT

A solution applicator assembly comprises an upper body defining an upper channel. The upper body further includes a primary inlet fluidly connected to the upper channel. A lower body defines a lower channel being fluidly connectable to the upper channel to define a central channel. The lower body further defines a primary outlet fluidly connected to the lower channel. A flow control insert is removeably receivable in the central channel for receiving a chemical solution from the upper channel and releasing the solution into the lower channel. The upper body and the lower body are removeably connectable to one another to selectively allow the flow control insert to be removed and positioned in the central channel.

14 Claims, 6 Drawing Sheets

(56) References Cited

U.S. PATENT DOCUMENTS

| | | | |
|---|---|---|---|
| 9,421,559 B2 | 8/2016 | Cornett et al. | |
| 9,421,566 B2 | 8/2016 | Harris et al. | |
| 9,468,892 B2 | 10/2016 | Harris et al. | |
| 9,561,481 B2 | 2/2017 | Schlueter et al. | |
| 9,808,773 B2 | 11/2017 | Schlueter et al. | |
| 9,901,943 B2 | 2/2018 | Schmalz | |
| 10,138,110 B2 | 11/2018 | Bates et al. | |
| 10,189,180 B2 | 1/2019 | Wittbold et al. | |
| 10,391,460 B2 * | 8/2019 | Hanada | B01F 23/45 |
| 10,443,747 B2 | 10/2019 | Harris et al. | |
| 10,981,123 B2 | 4/2021 | Park | |
| 11,092,251 B2 | 8/2021 | Harris et al. | |
| 2019/0022607 A1 | 1/2019 | Flood | |
| 2020/0085669 A1 | 3/2020 | Lee | |
| 2020/0261866 A1 | 8/2020 | Petrangeli et al. | |
| 2020/0282959 A1 | 9/2020 | Anderson | |
| 2020/0368699 A1 | 11/2020 | Williams et al. | |
| 2021/0252531 A1 | 8/2021 | Boily | |
| 2021/0379544 A1 * | 12/2021 | Asano | B01F 25/432 |
| 2022/0072488 A1 * | 3/2022 | Brauer | B01F 25/312 |

FOREIGN PATENT DOCUMENTS

| | | |
|---|---|---|
| CN | 107029573 B | 7/2019 |
| CN | 109990117 A | 7/2019 |
| CN | 107008169 B | 8/2019 |
| EP | 2734294 B1 | 1/2016 |
| EP | 2734768 B1 | 3/2018 |
| EP | 2734761 B1 | 4/2018 |
| EP | 3320965 B1 | 9/2019 |
| EP | 3065851 B1 | 1/2020 |
| EP | 3655146 A1 | 5/2020 |
| EP | 3694634 B1 | 5/2021 |
| KR | 102200123 B1 | 1/2020 |
| KR | 102200119 B1 | 1/2021 |

* cited by examiner

SOLUTION APPLICATOR ASSEMBLY WITH REMOVABLE FLOW CONTROL INSERT

CROSS-REFERENCE TO RELATED APPLICATIONS

This application claims the benefit of U.S. Provisional Patent Application Ser. No. 63/237,980, filed on Aug. 27, 2021, the entire disclosure of which is hereby incorporated by reference in its entirety.

FIELD OF THE DISCLOSURE

The present disclosure relates to a solution applicator assembly. More particularly, the present disclose relates to a solution applicator assembly having a removable flow control insert for accelerating a solution.

BACKGROUND OF THE DISCLOSURE

This section provides background information related to the present disclosure which is not necessarily prior art.

Solution applicator assemblies are known for emitting a liquid stream or foamy mixture of a solution such as a water and chemical mixture at an outlet of the assembly. Such assemblies are often used for cleaning purposes, such as in industrial food processing. A common feature among solution applicator assemblies is that the solution must pass through a relatively small orifice known as a jet of a flow control unit in order to accelerate and reduce a pressure of the solution. An issue is that over time, hard water deposits, dried chemical residue, rust scale from piping, or other debris can clog or partially clog the jet and degrade performance or even render the assembly inoperable.

To address this issue, it is known to disassemble the entire assembly and soak a body of the assembly which includes the flow control unit in an acid bath to remove mineral deposits. However, a problem with this approach is that pipe fittings have to become disconnected in order to disassemble the assembly, thus requiring resealing during reassembly. Additionally, the assembly and associated equipment are rendered inoperable for a prolonged period of time until the acid bath is completed.

Venturi-based chemical injector assemblies utilize a flow control unit for mixing a water stream with a chemical. The flow control unit is configured to draw in the chemical via a reduced pressure of the water passing through a neck portion of the flow control unit near the jet in order to mix the water and chemical. Such venturi-based flow control units require a minimum water pressure at the jet in order to produce sufficient vacuum to draw the chemical into the venturi unit (e.g., 35 PSI) to mix the chemical with the water. Often, water pressure can fluctuate due to other demands (e.g., other equipment), causing a pressure drop at the injector assembly. Another possibility is that the size and length of a supply pipe connected to the injector assembly is such that its flow capacity is insufficient to maintain a required performance at the jet while the assembly is in use, thus causing a degradation in performance. In such situations, it is known to change the venturi unit, however, such an operation requires complete disassembly and replacement of a large number of components of the assembly.

In view of the foregoing, there remains a need for improvements to such solution applicator assemblies.

SUMMARY OF THE DISCLOSURE

This section provides a general summary of the disclosure and is not intended to be interpreted as a comprehensive listing of its full scope or of all of its objects, aspects, features and/or advantages.

According to an aspect of the disclosure, a solution applicator assembly comprises an upper body defining an upper channel. The upper body further includes a primary inlet that is fluidly connected to the upper channel for receiving a solution. A lower body defines a lower channel that is fluidly connectable to the upper channel to define a central channel. The lower body further defines an outlet that is fluidly connected to the lower channel. A flow control insert is removeably receivable in the central channel for receiving and accelerating the solution from the upper channel and releasing it into the lower channel such that it may be emitted from the primary outlet. The upper body and the lower body are detachably connectable to one another to selectively allow the flow control insert to be removed and positioned in the central channel.

According to an aspect of the disclosure, a flow control insert for a solution applicator assembly is provided. The flow control insert comprises a fluid passage configured to convey fluid between a primary inlet and a primary outlet of the solution applicator assembly. The fluid passage includes a control outlet for expelling the fluid therefrom. The flow control insert also includes a lower flange disposed annularly around the control outlet. The lower flange defines at least one air injection hole extending therethrough for conveying air therethrough.

DRAWINGS

The drawings described herein are for illustrative purposes only of selected embodiments and not all possible implementations thereof such that the drawings are not intended to limit the scope of the present disclosure.

Figure 6:
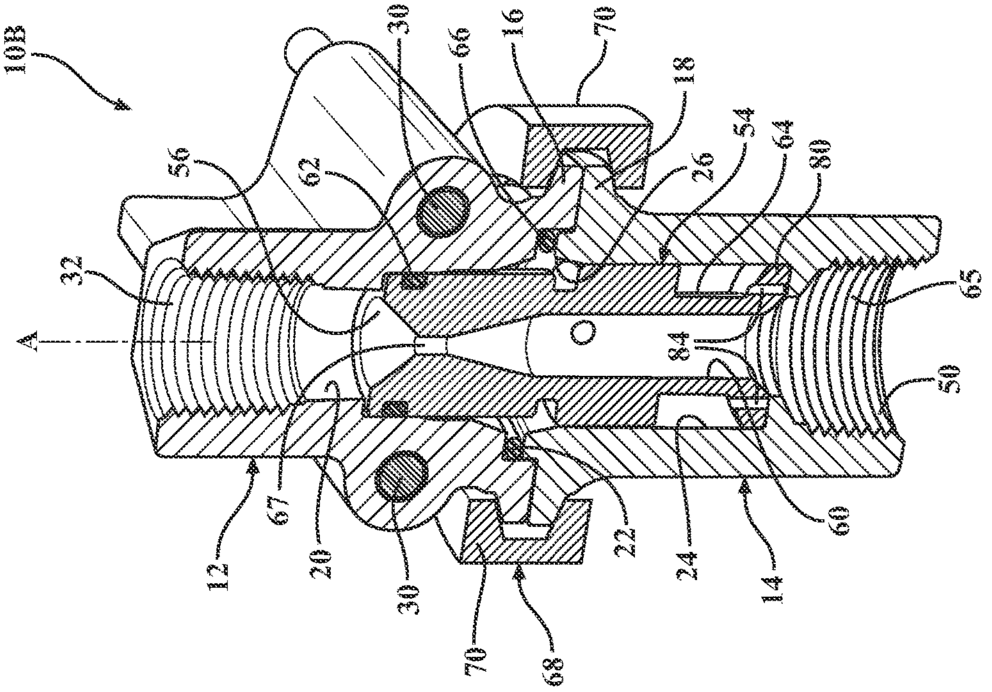
Figure 5:
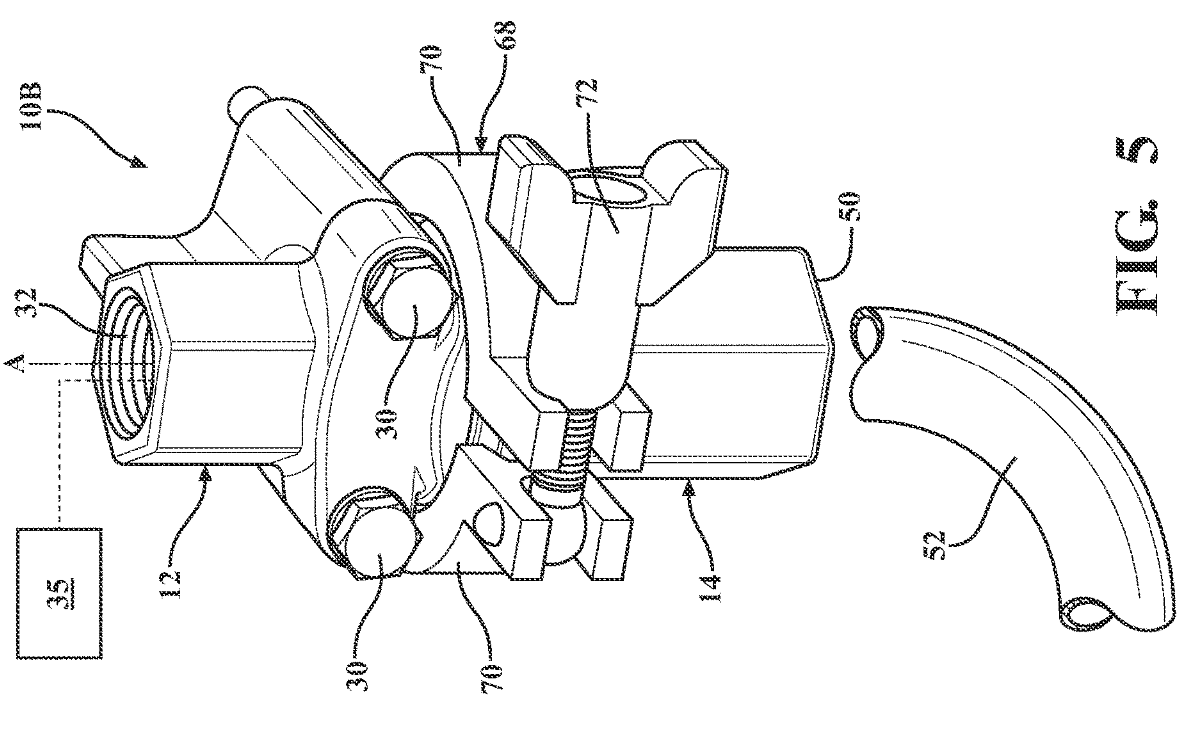
Figure 8:
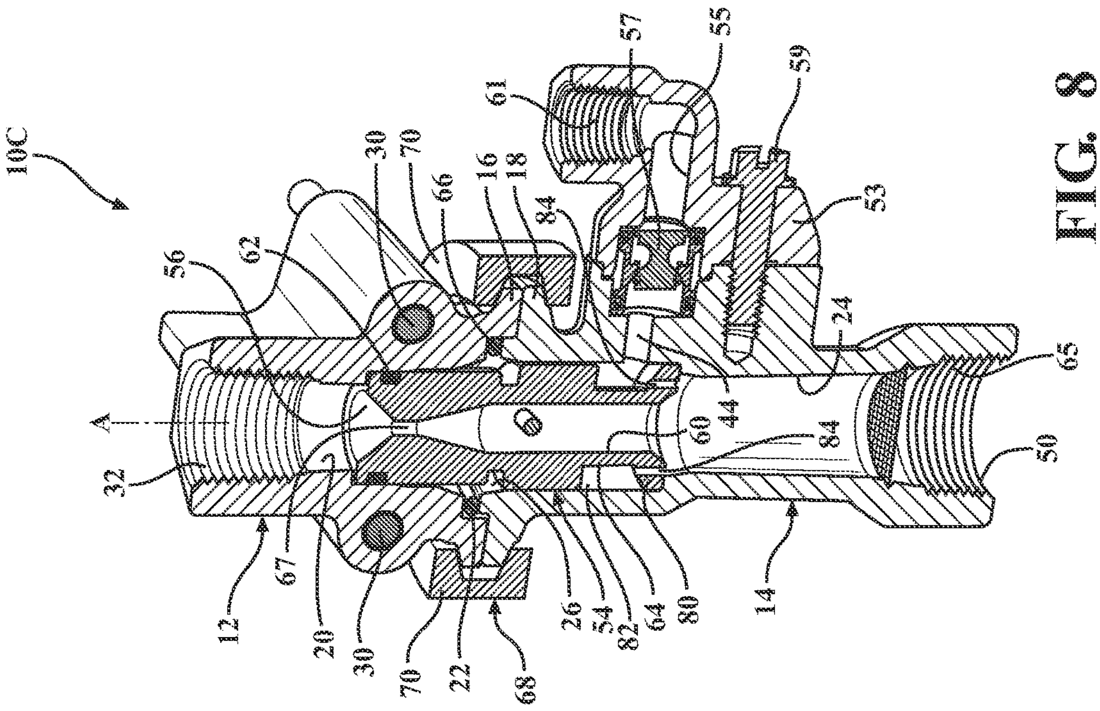
Figure 7:
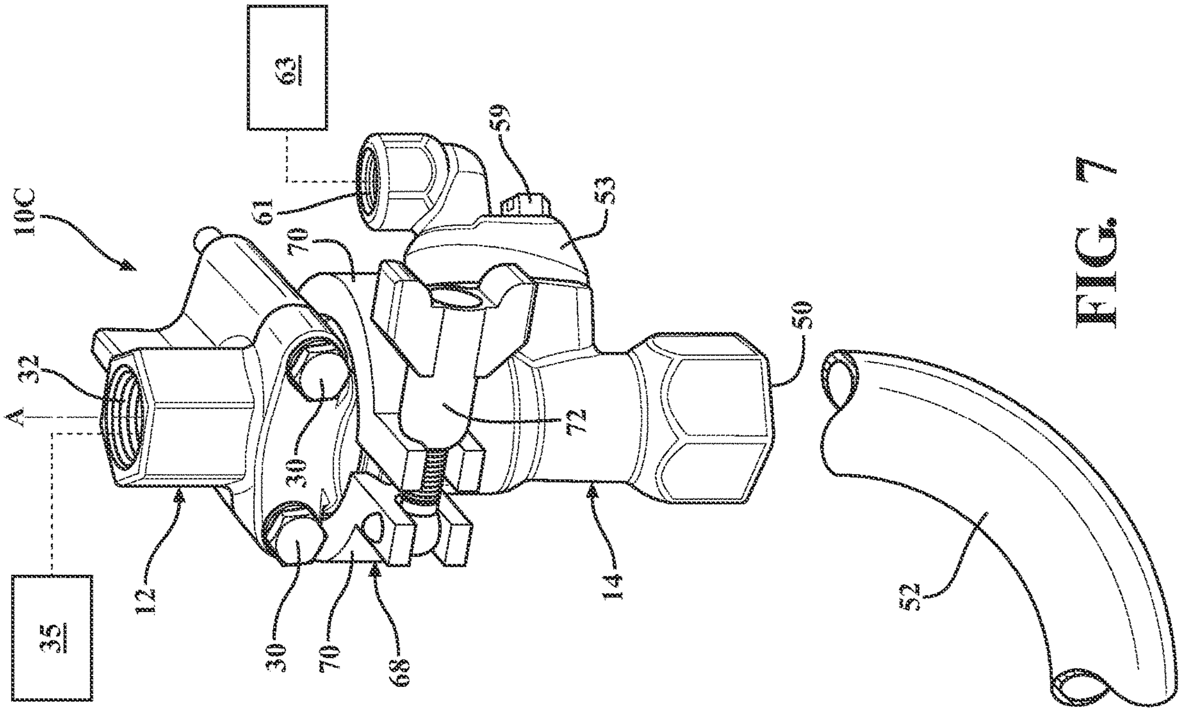
Figure 10:
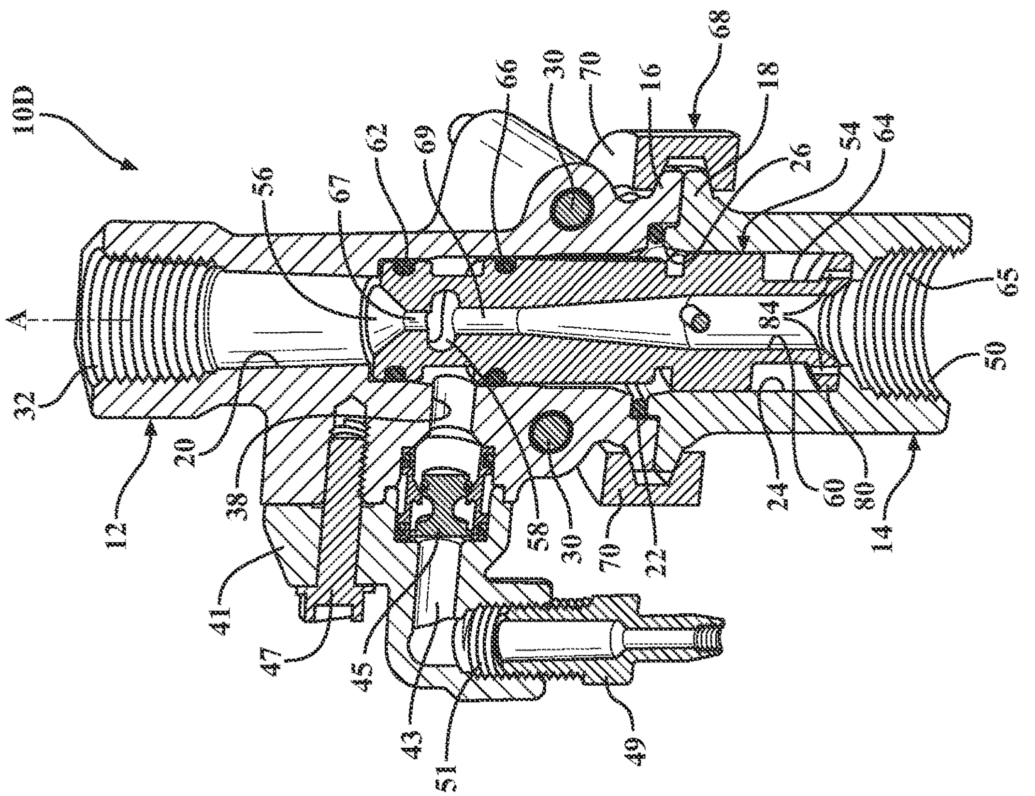
Figure 9:
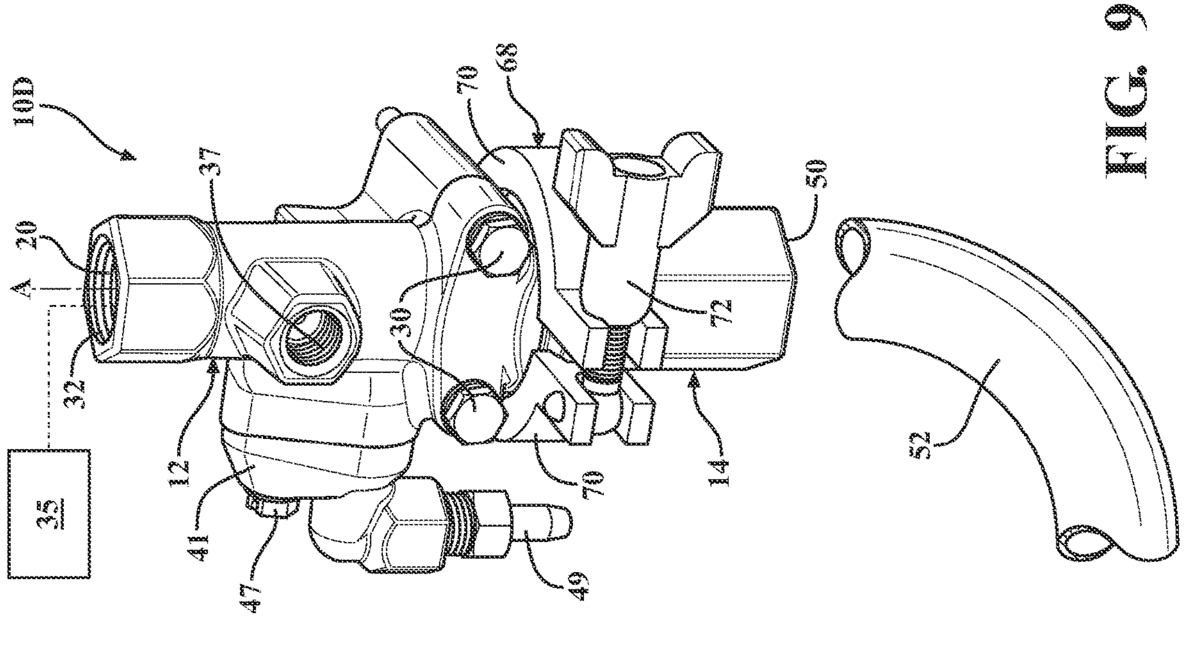

FIG. 5 if a perspective view of a second embodiment of the solution applicator assembly configured as a pump fed sprayer;

FIG. 6 is a perspective, cross-sectional view of the second embodiment of the solution applicator assembly;

FIG. 7 is a perspective view of a third embodiment of the solution applicator assembly configured as a pump fed foamer;

FIG. 8 is a perspective, cross-sectional view of the third embodiment of the solution applicator assembly;

FIG. 9 is a perspective view of a fourth embodiment of the solution applicator assembly configured as a venturi sprayer; and FIG. 10 is a perspective, cross-sectional view of the fourth embodiment of the solution applicator assembly.

DETAILED DESCRIPTION OF THE EXAMPLE EMBODIMENTS

Example embodiments of a solution applicator assembly 10A, 10B, 10C, 10D embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

More particularly, referring to the figures, wherein like numerals indicate corresponding parts throughout the several views, four embodiments of a solution applicator assembly 10A, 10B, 10C, 10D are shown. It should be appreciated that the term "solution" as used herein may encompass various types of solutions including, but not limited to, water alone, a chemical alone (e.g., a cleaning chemical), or various water and chemical combinations. The solution applicator assembly 10A, 10B, 10C, 10D may be used for various purposes including, but not limited to, industrial food processing applications.

The solution applicator assembly of the present disclosure may include an arrangement of a flow control insert and detachable upper and lower bodies. Such an arrangement may provide for the flow control insert to be easily and quickly removed or swapped for cleaning or for accommodating changing needs, e.g., variations in fluid pressure, thus saving time and money. Notably, this arrangement allows a flow control insert to be substituted while another is cleaned such that use of the solution applicator assembly is not lost. Furthermore, this arrangement allows the flow control insert to be inspect or serviced without disrupting other connections to the unit, such as pipe connections/threads.

A first embodiment 10A of the solution applicator assembly, which is configured as a venturi foamer style chemical injector assembly, is presented in FIGS. 1-4. The first embodiment 10A of the solution applicator assembly includes an upper body 12 and a lower body 14 that are removeably/detachably connectable to one another along an upper flange 16 of the upper body 12 and a lower flange 18 of the lower body 14. The upper flange 16 abuts the lower flange 18 to form a seal between the upper body 12 and the lower body 14. The upper body 12 defines an upper channel 20 that extends along an axis A and terminates at an upper opening 22 at the upper flange 16, and the lower body 14 defines a lower channel 24 that terminates at a lower opening 26 at the lower flange 18. The upper channel 20 and the lower channel 24 together define a central channel 20, 24 while the upper and lower bodies 12, 14 are connected to one another.

The upper body 12 includes a mounting feature 30 for affixing the chemical injector assembly 10 to a mounting surface such as a wall or other mounting structure, e.g., a water pipe or bracket. As shown, the mounting feature 30 may include a pair of bolts 30 that extend through channels of the upper body 12 and the mounting surface. The upper body 12 also includes a primary inlet 32 that is located along the axis A and fluidly connected to the upper channel 20 along the axis A. The primary inlet 32 is connected to a water source 35 (schematically shown) for passing water into the upper channel 20. It should be appreciated that fluids other than water may be received by the primary inlet 32 without departing from the scope of the present disclosure. A water valve 34 is located axially in-line with the primary inlet 32 for adjusting a flow rate of water entering the upper channel 20. A water pressure gauge 36 is fluidly connected to the upper channel 20 through a water gauge port 37 and is configured to display a pressure of water entering the upper channel 20. It should be appreciated that alternatively various types of pressure sensors and associated displays could be employed to detect and display the water pressure in the upper channel 20.

Figure 1:
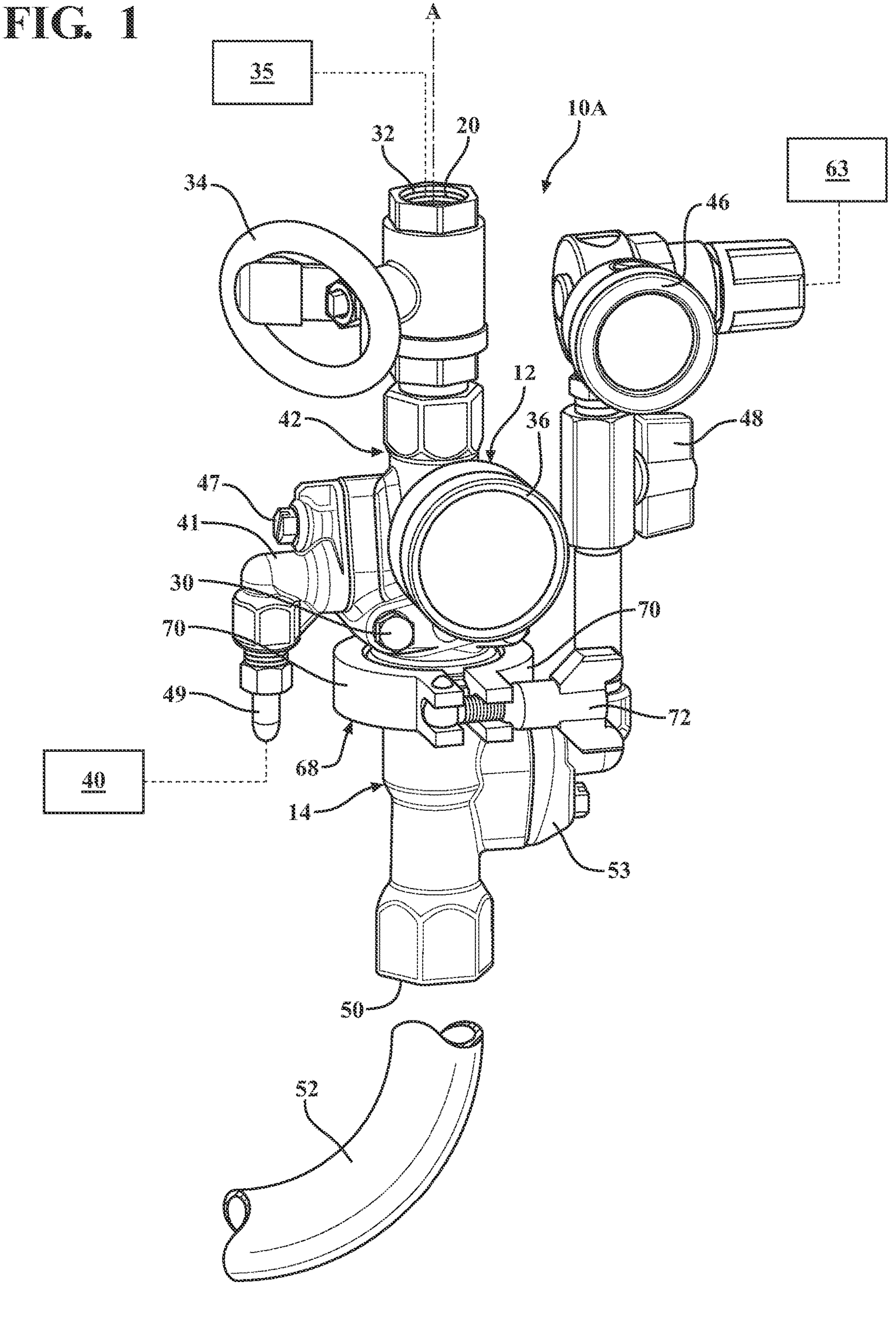
FIG. 1 is a perspective view of a first embodiment of a solution applicator assembly configured as a venturi foamer.
Figure 2:
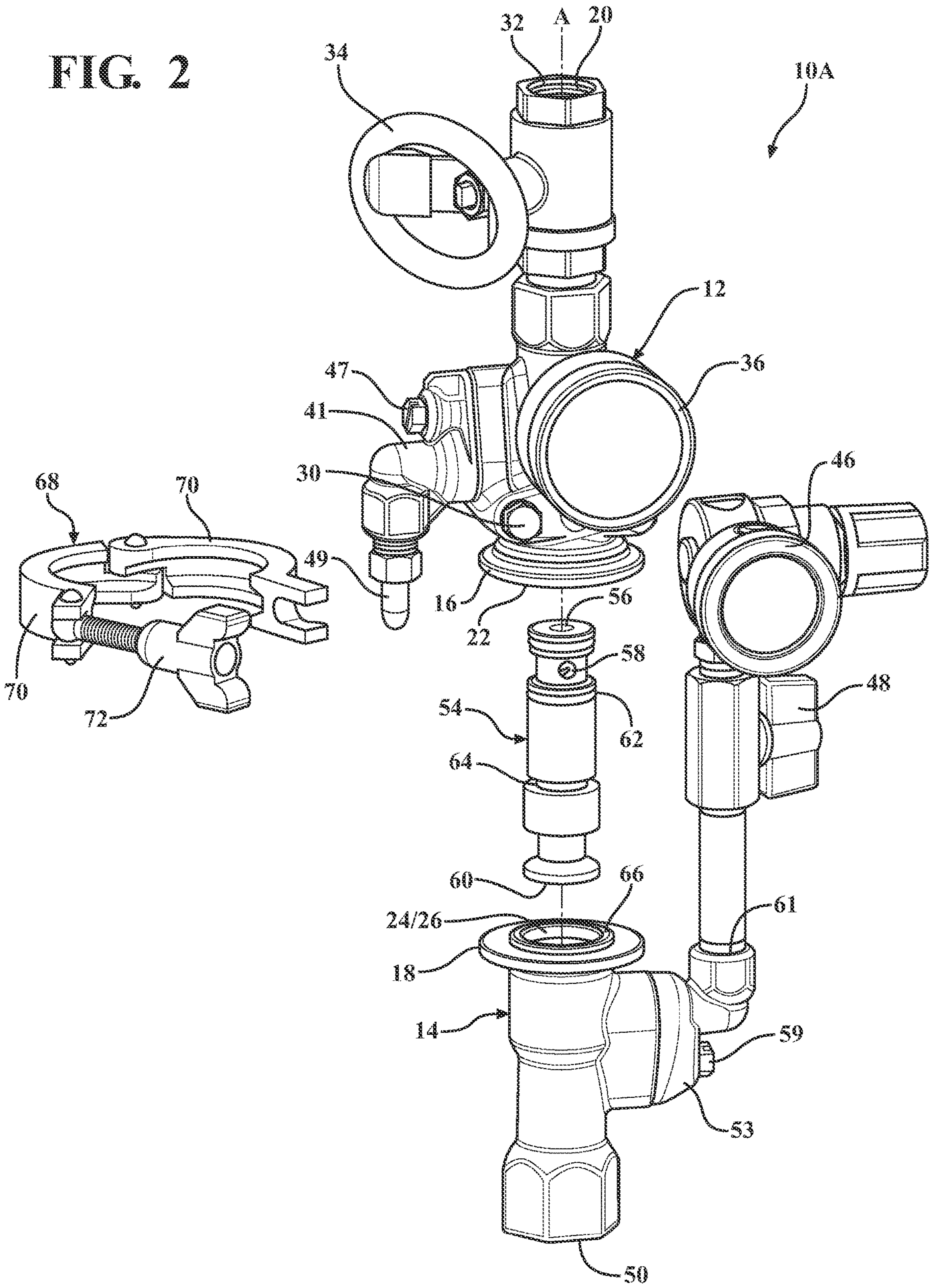
FIG. 2 is an exploded perspective view of the first embodiment of the solution applicator assembly.
Figure 4:
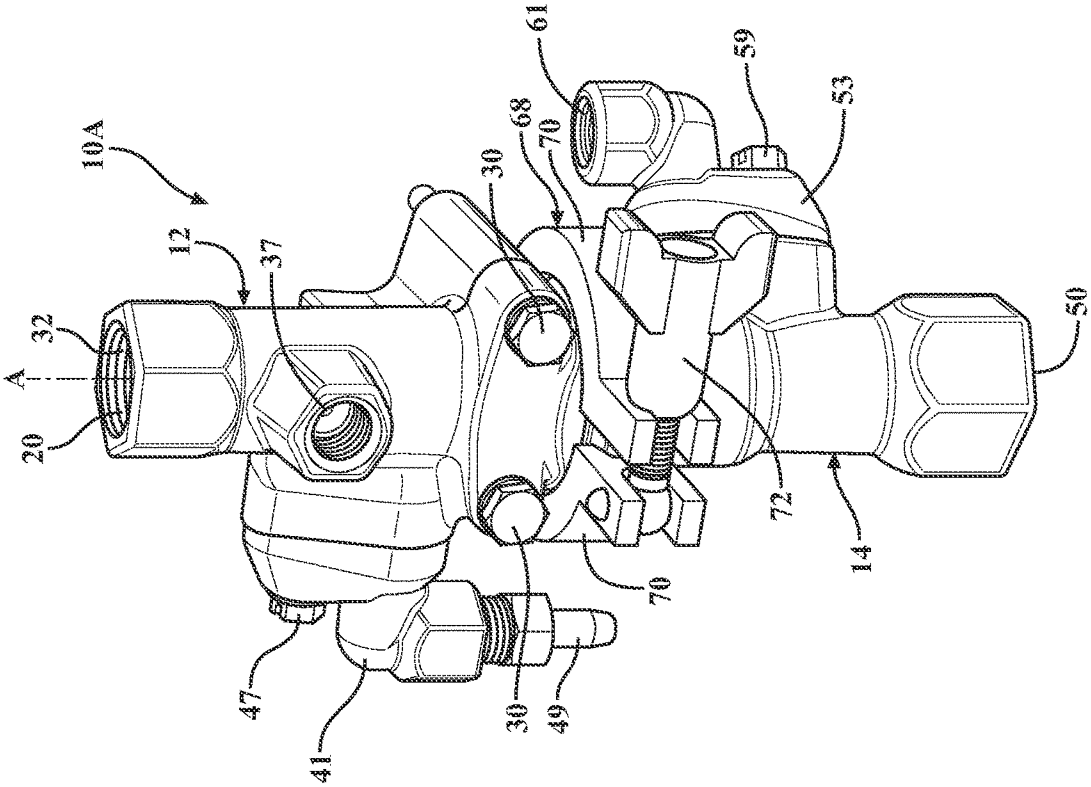
FIG. 4 is perspective view of the first embodiment of the solution applicator assembly, illustrating the chemical injector assembly without gauges connected thereto.
Figure 3:
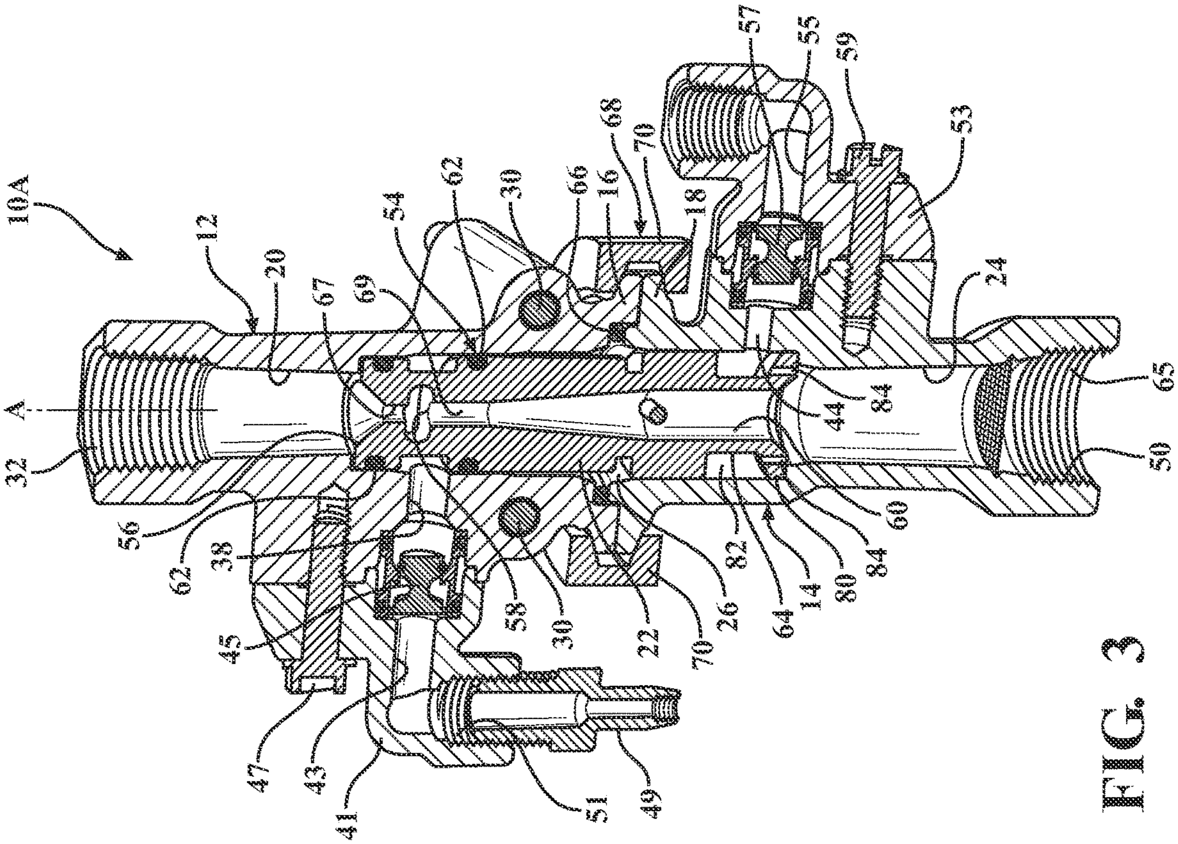
FIG. 3 is a perspective, cross-sectional view of the first embodiment of the solution applicator assembly.

The upper body 12 further includes one or more chemical inlets 38 that are fluidly connected to the upper channel 20 for receiving chemicals from a source of chemicals 40 (schematically shown) such that the chemicals may mix with the water. The chemicals may include various types of chemicals such as cleaning chemicals. As shown, a chemical flange 41 is coupled with the upper body 12 at the chemical inlet 38. The chemical flange 41 defines a chemical passage 43 that extends at a 90 degree angle. A chemical check valve 45 is located along the chemical inlet 38 and is secured against the upper body 12 by the chemical flange 41. The chemical check valve 45 is configured to permit chemicals to pass from the source of chemicals 40 to the chemical inlet 38 while preventing fluid flow in an opposite direction. In some embodiments, and as shown in FIG. 3, the chemical check valve 45 is configured as a cartridge assembly including a body having a seat, a movable portion that selectively seals against the seat, and seals for preventing fluid flow around the body of the chemical check valve 45. In some embodiments, at least a part of the chemical check valve 45 may be replaceable without disconnecting the upper body 12 from the lower body 14. For example, the entire cartridge assembly of the chemical check valve 45 may be replaceable by removing the chemical flange 41 from the upper body 12, which may not require disconnecting the upper body 12 from the lower body 14. In some embodiments or applications, the entire cartridge assembly of the chemical check valve 45 may be replaceable without interrupting fluid flow through the solution applicator assembly 10A.

A chemical fastener 47, such as a bolt or screw, secures the chemical flange 41 to the upper body 12. It should be appreciated that the chemical fastener 47 may be configured such that it may be hand tightened, e.g., as a hand screw/bolt, thereby permitting the chemical check valve 45 to be removed and replaced quickly and without specialized tools. It should be appreciated that the arrangement of the chemical check valve 45 and chemical fastener 47 allows the chemical check valve 45 to be removed or replaced without disrupting any threads or other distruptable fittings, thereby minimizing downtime and assembly time while accessing the check valve 45. A chemical adapter 49 is threadedly connected to a threaded connection 51 at an end of the chemical flange 41 for being connected to the source of chemicals. It should be appreciated that the threaded connection 51 of the chemical flange 41 permits various types of chemical adapters 49 to be employed for connection to different types of sources of chemicals 40.

The lower body 14 further defines an air inlet 44 that is fluidly connected to the lower channel 24 for receiving compressed air. An air gauge 46 is fluidly connected to the lower channel 24 for displaying a pressure of air entering the lower channel 24. It should be appreciated that alternatively various types of air pressure sensors and associated displays could be employed to detect and display the air pressure in the upper channel 20.

An air valve 48 is located upstream of the air inlet 44 for adjusting a flow rate of air entering the lower channel 24. An air flange 53 is coupled with the lower body 14 at the air inlet 44. The air flange 53 defines an air passage 55 that extends at a 90 degree angle. An air check valve 57 is located along the air inlet 44 and is secured against the lower body 14 by the air flange 53. The air check valve 57 is configured to permit fluid flow (e.g. airflow) into the air inlet 44 while preventing fluid flow of air and/or other fluids in the opposite direction.

In some embodiments, and as shown in FIG. 3, the air check valve 57 is configured as a cartridge assembly including a body having a seat, a movable portion that selectively seals against the seat, and seals for preventing fluid flow around the body of the air check valve 57. In some embodiments, at least a part of the air check valve 57 may be replaceable without disconnecting the upper body 12 from the lower body 14. For example, the entire cartridge assembly of the air check valve 57 may be replaceable by removing the air flange 53 from the upper body 12, which may not require disconnecting the upper body 12 from the lower body 14. In some embodiments or applications, the entire cartridge assembly of the air check valve 57 may be replaceable without interrupting fluid flow through the solution applicator assembly 10A.

An air fastener 59, such as a bolt or screw, secures the air flange 53 to the lower body 14. It should be appreciated that the air fastener 59 may be constructed such that it may be hand tightened, e.g., as a hand screw/bolt, thereby permitting the air check valve 57 to be removed and replaced quickly and without specialized tools. An air threaded connection 61 is located at an end of the air flange 53 for receiving an air adapter for being connected to a source of compressed air 63. It should be appreciated that the air threaded connection 61 permits various types of air adapters to be employed for connection to different types of sources of compressed air. It should be appreciated that the arrangement of the air check valve 57 and air fastener 53 allows the air check valve 57 to be removed or replaced without disrupting any threads or other distruptable fittings, thereby minimizing downtime and assembly time while accessing the air check valve 57.

The lower body 14 further defines a primary outlet 50 along the axis A and fluidly connected to the lower channel 24 for emitting a foam produced by the water, air and chemicals introduced into the upper and lower channels 20, 24. The primary outlet 50 defines a primary threaded connection 65 for being connected to a dispensing hose 52 to allow a user to irent the stream or foam to desired locations.

A flow control insert 54 is receivable in the central channel 20, 24, with part of the flow control insert 54 located in the upper channel 20 and part of the flow control insert 54 located in the lower channel 24 when the upper and lower bodies 12, 14 are connected. According to this embodiment, the flow control insert 54 is configured as a venturi insert such that it uses the venturi effect to mix the water and chemical together with the chemical solution being diluted by the water at a desired rate. More particularly, the flow control insert 54 includes a primary intake 56 that terminates at a jet portion 67 inside the flow control insert 54, a throat portion 69 inside the flow control insert 54 which has a reduced diameter, a chemical opening 58 intersecting the throat portion 69 for receiving the chemical, and a control outlet 60 at which a water/chemical mixture is expelled. The flow control insert 54 may cause the chemical to be pulled from the one or more chemical inlets 38 and into the throat portion 69 by the Venturi effect, and thereby mixing the chemical with the water flow from the primary inlet 32.

Together, the primary intake 56, the jet portion 67, the throat portion 69, and the control outlet 60 define a fluid passage 56, 67, 69, 60 that extends through the flow control insert 54 for conveying fluid between the primary inlet 32 and the primary outlet 50, while regulating a flow rate therethrough. The flow control insert 54 is configured to create a vacuum along the throat portion 69 due to a decreased diameter at the throat portion 69 to draw in the chemical through the chemical opening 58 such that the water and chemicals are mixed and emitted through the control outlet 60. The water/chemical fixture is further mixed with the compressed air in the lower channel 24 to create a foam which is emitted through the primary outlet 50. The flow control insert 54 is sealed within the upper body 12 with one or more seals 62, such as one or more O-rings.

The flow control insert 54 also defines an annular groove 64 below a lowermost one of the seals 62 to define a lower flange 80 and an annular airflow page 82 surrounding control outlet 60 and in fluid communication with the air inlet 44 for receiving airflow therefrom. The lower flange 80 of the flow control insert 54 defines at least one air injection hole extending therethrough for conveying air from the air inlet 44 into the lower channel 24, where the air is mixed with fluid, such as the water/chemical mixture expelled from the control outlet 60.

In some embodiments, and as shown in FIG. 3, the lower flange 80 defines one or more air injection holes 84. In some embodiments, the air injection holes 84 may be spaced apart at regular angular intervals around the lower flange 80. The number and/or the size of the air injection holes 84 may be selected to regulate an amount of air that is expelled therefrom. In some embodiments, a number of the air injection holes 84 and/or a size of the air injection holes 84 may be selected to provide an airflow rate that is proportional to a fluid flow rate through the fluid passage 56, 67, 69, 60 of the flow control insert 54. A flow control insert 54 configured to provide a first fluid flow rate may have a greater number and/or larger size of air injection holes 84 than another flow control insert 54 configured to provide a second fluid flow rate that is less than the first fluid flow rate. For example, a first flow control insert 54 configured to provide a first fluid flow rate of 25 gallons per minute (GPM) may include four air injection holes 84, whereas a second flow control insert 54 configured to provide the second fluid flow rate of 13 GPM may include only three of the air injection holes 84. The four air injection holes 84 of the first flow control insert 54 may be spaced apart at regular angular intervals of 90-degrees, and the three air injection holes 84 of the second flow control insert 54 may be spaced apart at regular angular intervals of 120-degrees. However, the air injection holes 84 may have a different number and/or a different spacing. Alternatively or additionally, a size, such as a length and/or diameter of the air injection holes 84 may be selected to provide an airflow rate that is proportional to a fluid flow rate through the fluid passage 56, 67, 69, 60 of the flow control insert 54. For example, the first flow control insert 54 configured to provide the first fluid flow rate of 25 gallons per minute (GPM) may include air injection holes 84 having a relatively large size, whereas the second flow control insert 54 configured to provide the second fluid flow rate of 13 GPM may include air injection holes 84 that are each smaller than the corresponding air injection holes 84 of the first flow control insert.

The annular groove 64 of the flow control insert 54 may also receive a screwdriver or other tool for pulling the flow control insert 54 downwardly outside of the upper body 12 when the upper and lower bodies 12, 14 are disconnected (discussed in further detail below) to the extent that the seals 62 inhibit removal thereof. The flow control insert 54 is comprised of a single piece, thus the jet portion 67 and the throat portion 69 are not adjustable, thereby preventing incompatible jet/throat portion 67, 69 combinations from unintentionally being employed.

A body seal 66, such as an O-ring, is located axially between the upper and lower flanges 16, 18 for sealing the upper channel 20 and the lower channel 24 at the union of the upper and lower flanges 16, 18. A clamp 68 is connectable about the upper and lower flanges 16, 18 for axially fixing the upper and lower flanges 16, 18 to one another. The clamp 68 includes a pair of C-shaped leg members 70 that are pivotably connected to one another and moveable between an open position allowing an operator to locate the clamp 68 about the upper and lower flanges 16, 18, and a closed position secured about the upper and lower flanges 16, 18. A tightening screw 72 is configured to tighten the leg members 70 of the clamp 68 while in the closed position. The tightening screw 72 is configured such that it may be tightened and loosened by hand. It should be appreciated that the arrangement of the clamp 68 allows the upper and lower bodies 12, 14 to quickly and easily be connected to one another. Other mechanisms for releasably connecting the upper and lower bodies 12, 14 may be used, such as a cam lever, union nut, or ball-lock style quick connect, without departing from the scope of the subject disclosure.

In the event that the flow control insert 54 needs to be removed, the clamp 68 is moved into the open position and removed from the assembly 10. Once the clamp 68 is removed, the lower body 14 is axially pulled away from the upper body 12, which exposes a portion of the flow control insert 54. The flow control insert 54 may then be withdrawn from the upper channel 20 by being grasped and pulled axially downwardly (friction from the seal 62 may otherwise hold it in place). As previously discussed, a tool such as a screwdriver may be positioned in the annular groove 64 to pull the flow control insert 54 downwardly.

Because of the arrangement of the flow control insert 54 and easily detachable upper and lower bodies 12, 14, the flow control insert 54 may easily and quickly be removed/replaced for cleaning or for accommodating changing needs, e.g., variations in water pressure. This provides savings in terms of both time and money. For example, if a currently installed flow control insert 54 has a flow rate requirement that the water source 35 cannot reliably sustain, a lower-flowing flow control insert 54 can be installed to ensure consistent performance. Additionally, this arrangement allows a flow control insert 54 to be substituted with another during cleaning such that use of the chemical injector assembly 10 is not lost during the cleaning process. Furthermore, this allows the flow control insert 54 to be inspect or serviced without disturbing other connections to the unit, such as pipe connections/threads. Additionally, the arrangement of the upper and lower flanges 16, 18 and clamp 68 allows the flow control insert 54 to be removed without the use of any tools.

FIGS. 5-6 disclose a second embodiment 10B of the solution applicator assembly which is configured as a pump fed sprayer. This second embodiment 10B is configured to receive a pre-mixed solution of a water and chemicals through the primary inlet 32, and to emit a stream of the water/chemical mixture through the primary outlet 50. It should be appreciated that this arrangement is configured to emit a stream instead of a foam due to the absence of an air inlet. Like the first embodiment 10A, this second embodiment 10B includes an upper body 12 and a lower body 14 that are detachably connectable to one along upper and lower flanges 16, 18. Furthermore, this second embodiment 10B includes a flow control insert 54 that includes a jet portion 67 for further mixing and increasing a velocity of the chemical and water mixture passing therethrough. However, this second embodiment 10B does not include a chemical inlet for receiving chemicals from a separate chemical source due to the presence of a chemical solution in the pre-mixed solution. This second embodiment 10B also does not include an air inlet. Thus, the primary inlet 32 may be the sole and only fluid inlet into the central channel 20, 24 of this second embodiment 10B of the solution applicator assembly.

FIGS. 7-8 disclose a third embodiment 10C of the solution applicator assembly that is configured as a pump fed sprayer. This third embodiment 10C is similar to the second embodiment 10B, but further includes an air inlet 44 and air flange in the same manner as the first embodiment 10A such that it emits a foam instead of a liquid stream. Thus, the air inlet 44 and the primary inlet 32 may be the only fluid inlets into the central channel 20, 24 of this third embodiment 10C of the solution applicator assembly.

FIGS. 9-10 disclose a fourth embodiment 10D of the solution applicator assembly that is configured as a venturi sprayer. This fourth embodiment 10D is similar to the first embodiment 10A, but does not include an air inlet 44 and associated air flange, such that it emits a liquid stream instead of a foam. Thus, the chemical inlet 38 and the primary inlet 32 may be the only fluid inlets into the central channel 20, 24 of this fourth embodiment 10D of the solution applicator assembly.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms.

These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment (including all of the described embodiments), even if not specifically shown or described. The same may also be varied in many ways. Such variations are not to be regarded as a departure from the disclosure, and all such modifications are intended to be included within the scope of the disclosure.

What is claimed is:

1. A solution applicator assembly, comprising:

an upper body defining an upper channel;

the upper body further including a primary inlet fluidly connected to the upper channel for receiving a solution;

a lower body defining a lower channel being fluidly connectable to the upper channel to define a central channel;

the lower body further defining a primary outlet fluidly connected to the lower channel;

a flow control insert removeably receivable in the central channel for receiving and accelerating the solution from the upper channel and releasing the solution into the lower channel such that it may be emitted from the primary outlet;

the flow control insert having a fluid passage extending therethrough for conveying the solution between the primary inlet and the primary outlet, the flow control passage having a primary intake for receiving the solution and a control outlet for emitting the solution;

the flow control insert having one or more air injection holes extending into the fluid passage between the primary intake and the control outlet for conveying air into the flow control insert for mixing the air with the solution;

the flow control insert defining a chemical opening extending into the fluid passage between the primary intake and the control outlet for receiving a chemical to mix the chemical with the solution; and the upper body and the lower body removeably connectable to one another to selectively allow the flow control insert to be removed and positioned in the central channel.

2. The solution applicator assembly of claim 1, wherein the flow control insert further includes a lower flange defining the one or more air injection holes extending therethrough for conveying air into the lower channel.

3. The solution applicator assembly of claim 2, wherein the flow control insert is configured to provide a predetermined flow rate through the fluid passage; and wherein the one or more air injection holes are configured to provide an airflow rate proportional to the predetermined flow rate through the fluid passage.

4. The solution applicator assembly of claim 3, wherein the solution applicator assembly further comprises a second flow control insert configured to replace the flow control insert and providing a second flow rate different than the predetermined flow rate.

5. The solution applicator assembly of claim 1, wherein the fluid passage includes a throat portion having a reduced diameter relative to the primary intake for accelerating fluid flow therethrough.

6. The solution applicator assembly of claim 5, wherein the chemical opening intersects the throat portion for receiving a chemical from a chemical inlet and thereby mixing the chemical with the fluid flow from the primary inlet.

7. The solution applicator assembly of claim 1, further comprising:

the upper body including an upper flange and the lower body including a lower flange configured to engage the upper flange of the upper body to form a seal between the upper body and the lower body; and a clamp connectable about the upper flange and the lower flange for axially fixing the upper flange to the lower flange.

8. The solution applicator assembly of claim 1, further comprising:

at least one of the upper body or the lower body defining a chemical inlet for conveying a chemical into the chemical opening;

a chemical flange removably coupled to the at least one of the upper body or the lower body and defining a chemical passage in fluid communication with the chemical inlet; and a chemical check valve configured to provide fluid flow into the chemical inlet while blocking fluid flow in an opposite direction.

9. The solution applicator assembly of claim 8, wherein the chemical check valve is replaceable without disconnecting the upper body from the lower body.

10. The solution applicator assembly of claim 8, wherein the chemical check valve is configured as a cartridge assembly including a body having a seat and a movable portion that selectively seals against the seat.

11. The solution applicator assembly of claim 1, further comprising:

an air flange removably coupled to the at least one of the upper body or the lower body and defining an air passage in fluid communication with the air inlet; and an air check valve configured to provide fluid flow into the air inlet while blocking fluid flow in an opposite direction.

12. The solution applicator assembly of claim 11, wherein the air check valve is replaceable without disconnecting the upper body from the lower body.

13. The solution applicator assembly of claim 11, wherein the air check valve is configured as a cartridge assembly including a body having a seat and a movable portion that selectively seals against the seat.

14. The solution applicator assembly of claim 1, wherein the primary inlet is an only fluid inlet into the central channel.

* * * * *